US009490886B2

(12) United States Patent
Lin

(10) Patent No.: US 9,490,886 B2
(45) Date of Patent: Nov. 8, 2016

(54) RF BEAMFORMING IN PHASED ARRAY APPLICATION

(75) Inventor: Saihua Lin, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 94 days.

(21) Appl. No.: 13/406,268

(22) Filed: Feb. 27, 2012

(65) Prior Publication Data

US 2013/0222056 A1    Aug. 29, 2013

(51) Int. Cl.
*H04B 7/06* (2006.01)
*H04B 7/08* (2006.01)
*H01Q 3/36* (2006.01)

(52) U.S. Cl.
CPC .............. *H04B 7/0617* (2013.01); *H01Q 3/36* (2013.01); *H04B 7/086* (2013.01)

(58) Field of Classification Search
USPC ........................... 455/131, 137–141; 375/258
See application file for complete search history.

(56) References Cited

U.S. PATENT DOCUMENTS

| | | | |
|---|---|---|---|
| 3,593,147 A * | 7/1971 | Gurak et al. ................. | 455/139 |
| 5,345,603 A * | 9/1994 | Laffont ......................... | 455/139 |
| 5,912,925 A * | 6/1999 | Palermo et al. ............. | 375/258 |
| 7,471,694 B2 | 12/2008 | Kent et al. | |
| 7,502,631 B2 | 3/2009 | Hashemi et al. | |
| 7,522,894 B2 * | 4/2009 | Kato et al. .................... | 455/131 |
| 7,546,110 B2 | 6/2009 | Ismail et al. | |
| 2006/0087376 A1 | 4/2006 | Young et al. | |
| 2008/0317160 A1 | 12/2008 | Tzeng et al. | |
| 2010/0259445 A1 * | 10/2010 | Corman ................... | H01Q 3/26 342/372 |
| 2011/0050499 A1 | 3/2011 | Jun et al. | |
| 2011/0063169 A1 | 3/2011 | Chen et al. | |
| 2013/0088391 A1 * | 4/2013 | Corman ................... | H04B 7/10 342/365 |

OTHER PUBLICATIONS

Natarajan, et al., "A Fully-Integrated 16-Element Phased-Array Receiver in SiGe BiCMOS for 60-GHz Communications," IEEE Journal of Solid-State Circuits, vol. 46, No. 5, May 2011, pp. 1059-1075.
Wang, et al., "Distributed Transmit Beamforming without Phase Feedback," EURASIP Journal on Wireless Communications and Networking [Online], pp. 1-8, 2010.
International Search Report and Written Opinion—PCT/US2013/028102—ISA/EPO—May 29, 2013.

* cited by examiner

*Primary Examiner* — Junpeng Chen
(74) *Attorney, Agent, or Firm* — Liberty E. Mann

(57) ABSTRACT

Exemplary embodiments are directed to a beamforming device. A device may include at least one receive path; and an amplifier coupled to an output of each receive path. The device configured to process each a signal from each receive path in at least one of a voltage domain and a current domain.

8 Claims, 9 Drawing Sheets

RF BEAMFORMING IN PHASED ARRAY APPLICATION

BACKGROUND

1. Field

The present invention relates generally to beamforming. More specifically, the present invention relates to systems, devices, and methods for radio frequency (RF) beamforming in phased array applications.

2. Background

Beamforming may used to control the directionality of the reception or transmission of a communication signal. In transmitting systems, beamformers may be employed between a signal source and antenna radiating elements to "shape" a radiated field in three dimensional space. In receiving systems, beamformers may be employed between antenna arrays and a receiver to affect (shape) the relative spatial sensitivity of a receiving system to signals originating in its field of view.

Radio frequency (RF) beamforming is popular in millimeter wave applications. Conventional RF beamforming architectures present many challenges. As one example, conventional RF phase rotators may utilize power combining and/or power splitting networks, which may split or combine power stage-by-stage. As will be appreciated by a person having ordinary skill in the art, power combining networks and power splitting networks may consume a large amount of area and may exhibit substantial loss.

A need exists for methods, systems, and devices to enhance beamforming in phased array applications. More specifically, a need exists for methods, systems, and devices for reducing an amount of area of a beamforming architecture. Further, a need exists for methods, systems, and devices for reducing power loss of a beamforming architecture.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Figure 1:
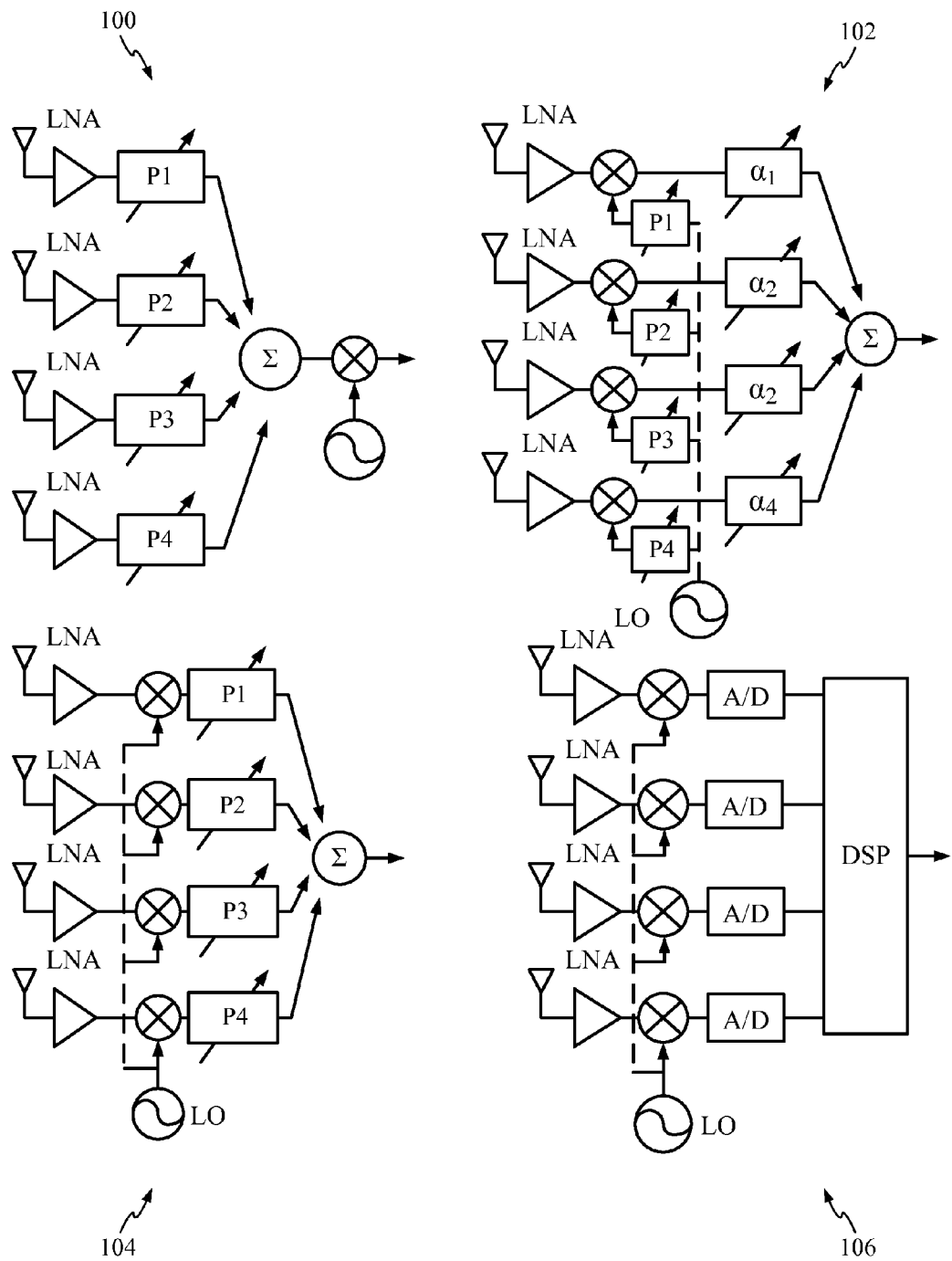
FIG. 1 depicts various beamforming array architectures.

As will be understood by a person having ordinary skill in the art, in conventional point-to-point communication, a large amount of energy may be wasted when utilizing a one antenna solution. Accordingly, various array architectures (i.e., an array of antennas), which may focus energy in a spatial domain, are well known in the art. FIG. 1 illustrates various beamforming array architectures. Although FIG. 1 illustrates various receiver-based beamforming array architectures, one having ordinary skill will understand transmitter-based beamforming array architectures. Specifically, reference numeral 100 indicates a radio frequency (RF) path beamforming architecture, reference numeral 102 indicates a local oscillator (LO) path beamforming architecture, reference numeral 104 indicates an intermediate frequency (IF) path beamforming architecture, and reference numeral 106 indicates a digital domain architecture.

As will be understood, RF path beamforming may utilize a small area and low power. Further, RF path beamforming, such as RF path beamforming architecture 100, may exhibit a good signal-to-noise ratio (SNR) and a good signal to interference-plus-noise ratio (SINR). However, challenges of RF path beamforming include designing for a high linearity, wide band, low loss, and low-area RF phase shifter. Further, LO path beamforming, such as LO path beamforming architecture 102, may exhibit low sensitivity to LO amplitude variations. On the other hand, challenges of LO path beamforming include design of a large LO network, and it may be difficult to generate a millimeter wave LO signal. IF path beamforming, such as IF path beamforming architecture 104, may exhibit good linearity and may utilize a low power phase shifter. However, IF path beamforming includes less component sharing and a large LO network. Further, offset calibration may be difficult to multiple mixers. Additionally, although a digital domain architecture, such as digital domain architecture 106, may be versatile, it may require a fast digital signal processor and may exhibit high power consumption.

Figure 2A:
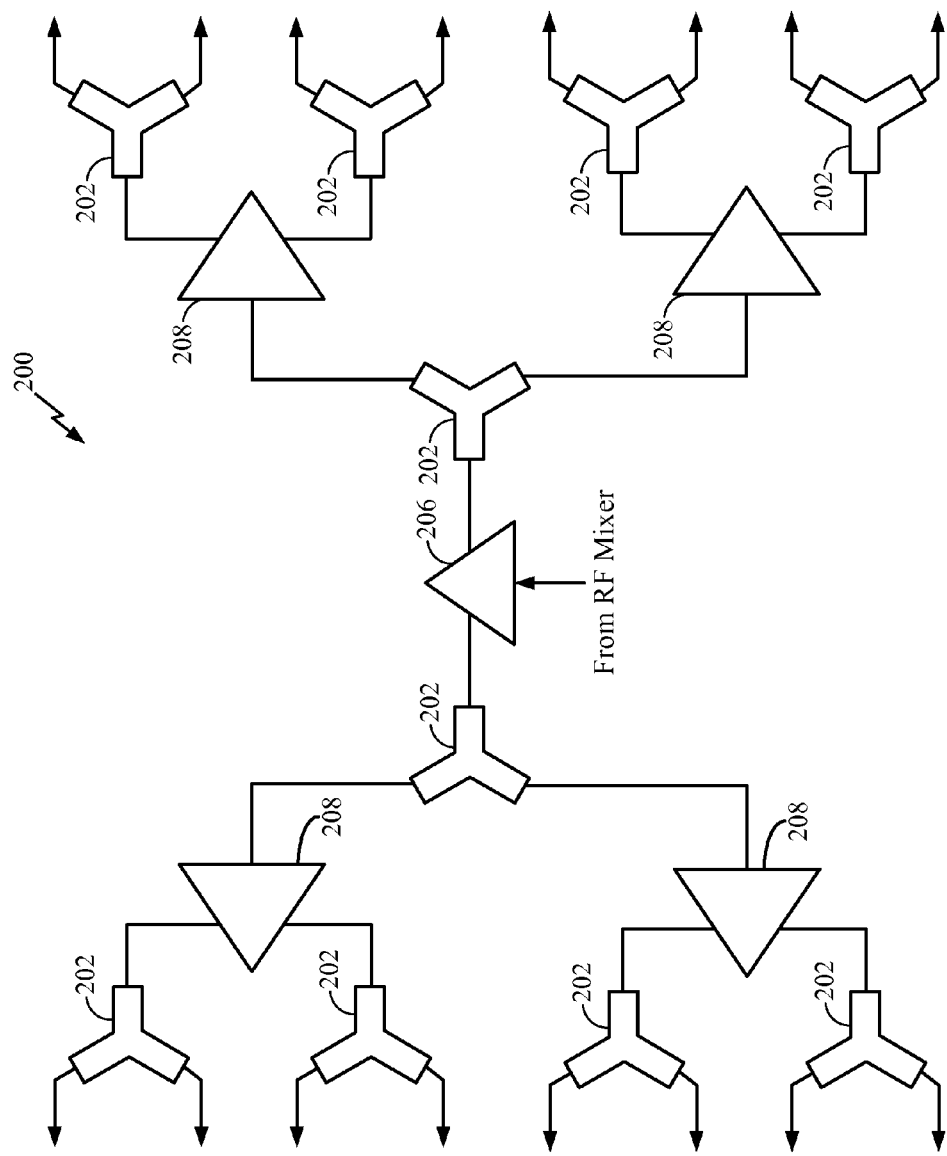
FIG. 2A illustrates a beamforming transmitter including a plurality of power splitters.

FIG. 2A illustrates a transmitter beamforming device 200 including a plurality of power splitters 202. Beamforming device 200 further includes an amplifier 206 configured to receive a signal from a radio frequency (RF) mixer (not shown) and distribution amplifiers 208. As will be appreciated by a person having ordinary skill in the art, beamforming device 200 splits power stage-by-stage in a 1:16 power distribution tree. Each power splitter 202 may consume a large amount of area and may exhibit substantial loss. As a result, the gain and 1 dB output power compression point of the device 200 may be degraded.

Figure 2B:
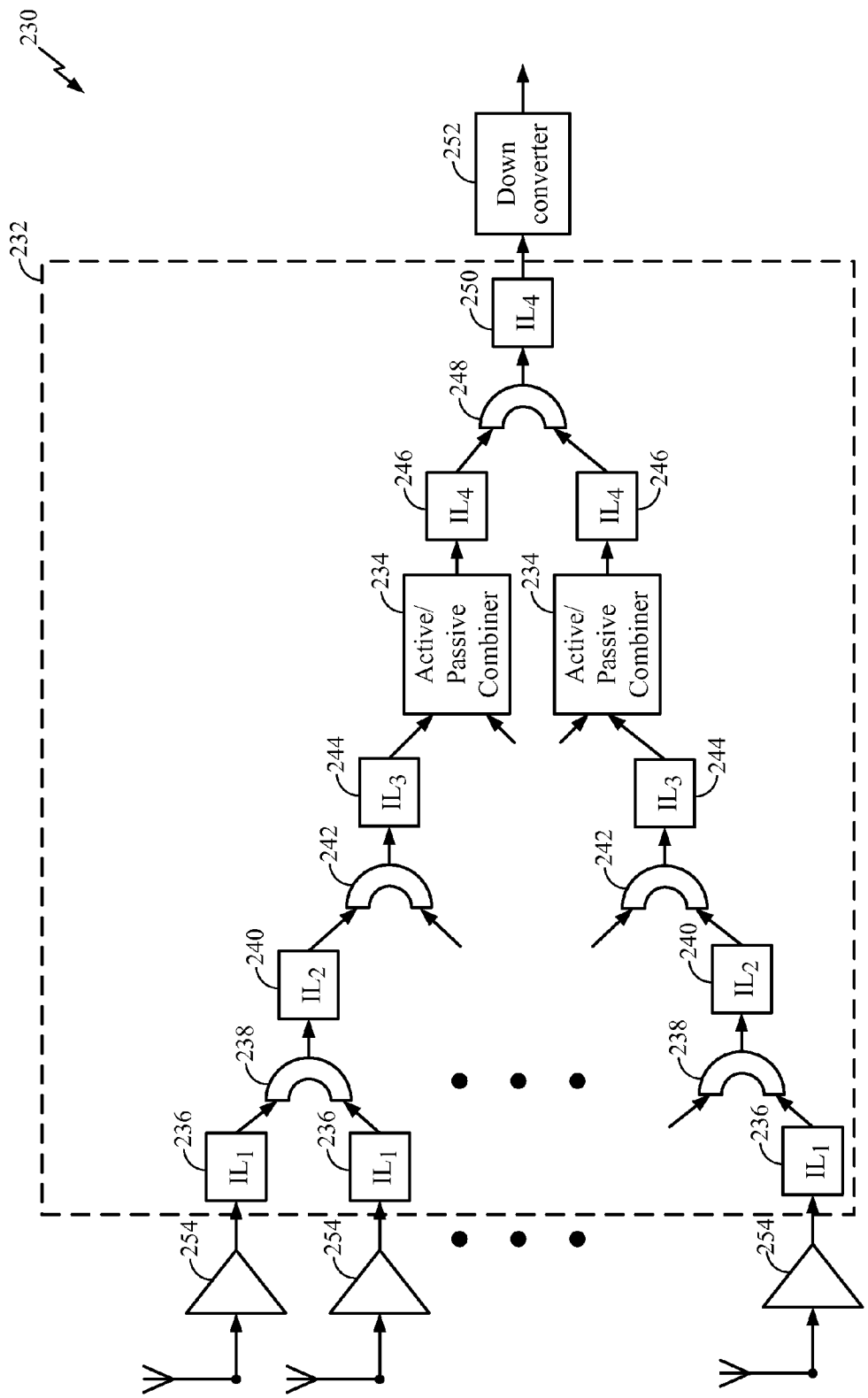
FIG. 2B illustrates a beamforming receiver including a plurality of power combiners.

FIG. 2B illustrates a receiving beamforming device 230 including a power combining network 232 coupled between a plurality of low noise amplifiers (LNAs) 254 or a down-converter 252. As illustrated, power combining network 232 includes a plurality of passive combiners 238, 242, 248 and active power combiners 234. The insertion loss (IL) of power combiner 238 is denoted by block 236. Further, the insertion loss of power combiners 242 and 248 is illustrated by blocks 240, 244, 246, and 250. As will be understood by a person having ordinary skill, each power combiner 238, 242, 248, 234 may consume a large amount of area and may exhibit substantial loss. Further, due at least partially to the use of power combiners 238, 242, 248, 234, which combine power stage-by-stage, a noise figure of beamforming device 230 may be degraded.

Figure 3:
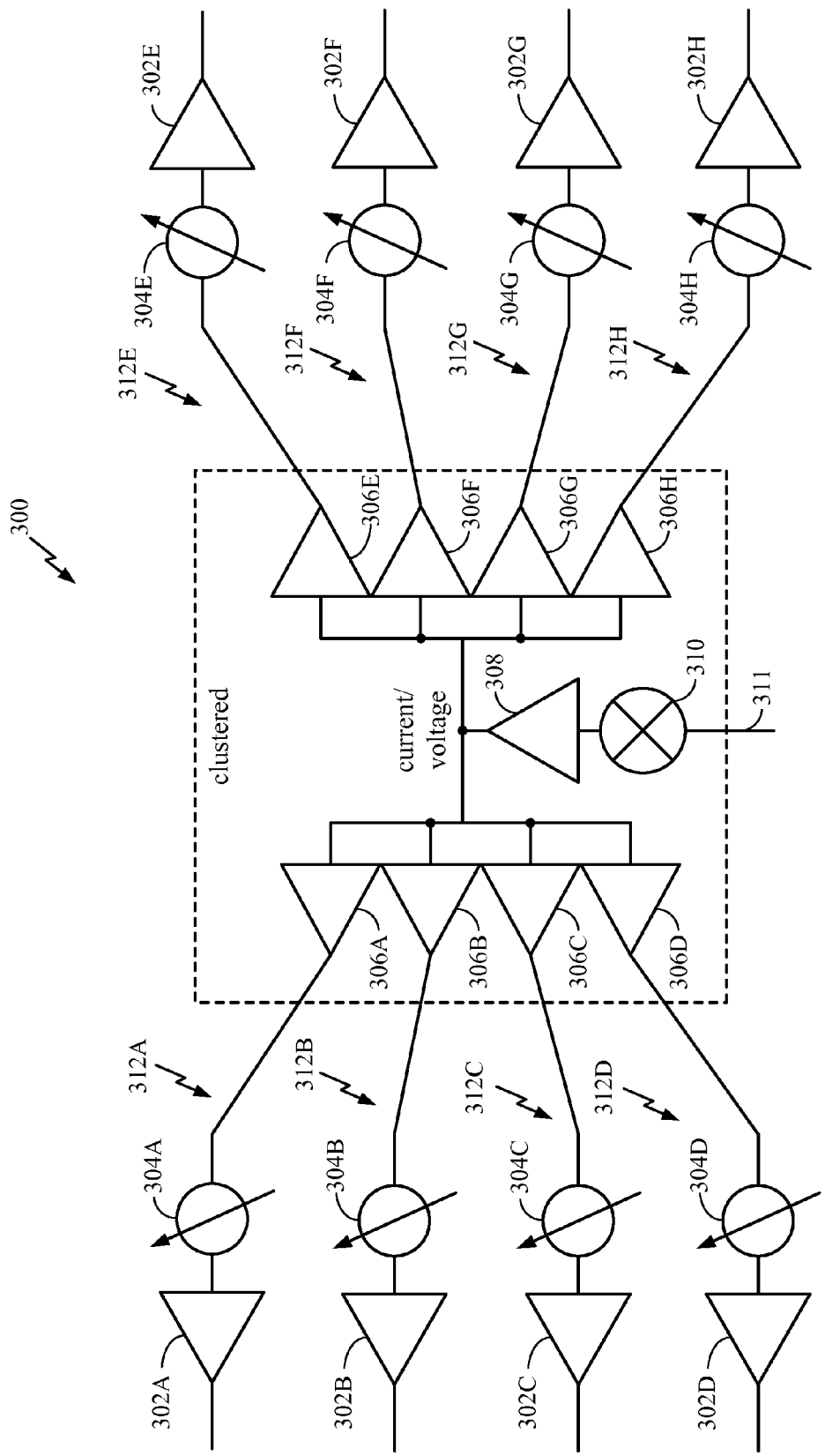
FIG. 3 illustrates a transmitter beamforming device, in accordance with an exemplary embodiment of the present invention.

FIG. 3 illustrates a device 300, according to an exemplary embodiment of the present invention. Device 300, which may also be referred to as a "transmitter beamforming architecture," includes a plurality of transmit paths 312A-312H. Each transmit path 312 of device 300 includes a driver amplifier 306, a phase shifter 304, and a power amplifier 302. More specifically, for example, transmit path 312A includes driver amplifier 306A, phase shifter 304A, and power amplifier 302A. Although device 300 is illustrated as having eight transmit paths, embodiments of the present invention are not so limited. Rather, device 300 may include any number of transmit paths. Device 300 further includes a mixer 310 configured to receive a signal 311. Further, mixer 310 has an output coupled to amplifier 308. An output of amplifier 308 is coupled to each transmit path 312A-312H. More specifically, in the exemplary embodiment illustrated in FIG. 3, output of amplifier 308 is coupled to each input of a plurality of driver amplifiers 306A-306H. Each driver amplifier 306 has an output coupled to a respective phase shifter 304, which is further coupled to a respective power amplifier 302. It is noted that device 300 includes eight antenna branches (i.e., each transmit path is associated with an antenna).

The transmit paths 312A-312H of device 300 may have similar or different routing lengths. Further, a phase shifter may be utilized to compensate for phase differences caused by different routing lengths. It is further noted that, according to one exemplary embodiment, driver amplifiers 306A-306H may be clustered proximate mixer 310. Stated another way, driver amplifiers 306A-306H may be physically proximate mixer 310 and, therefore, the distributed effect, which normally exists in millimeter wave circuits, may not be significant. As a result, a voltage and/or current domain may be used rather than a power domain.

During a contemplated operation of device 300, mixer 310 may upconvert signal 311 to radio frequency (RF) and convey the upconverted signal to amplifier 308. Further, amplifier 308 may convey an amplified signal to each transmit path 312A-312H (i.e., amplifier 308 conveys an amplified signal to an input of each driver amplifier 306A-306H). Within each transmit path 312A-312H, the signal may be amplified by an associated driver amplifier 306, phase-shifted by an associated phase shifter 304 and amplified by an associated power amplifier 302. As an example, within transmit path 312C, a signal may be amplified by driver amplifier 306C, phase-shifted by phase shifter 304C, amplified by power amplifier 302C, and conveyed to an antenna coupled to power amplifier 302C. As will be appreciated by a person having ordinary skill each power amplifier 302 may be coupled to an antenna (not shown in FIG. 3).

It is noted that, in contrast to conventional beamforming architectures, device 300 is configured for signal splitting in a voltage domain, a current domain, or both, rather than a power domain. As a result, device 300 may not require power combining or power splitting networks, which undesirably consume large amounts of area. Further, loss due to power splitting may be avoided. In addition, device 300 includes a single mixer pair and simplifies in-phase and quadrature (IQ) and DC offset calibration compared to other methods of beamforming, such as baseband beamforming or LO beamforming. As a result, a complex local oscillator (LO) distribution may not be required.

Figure 4:
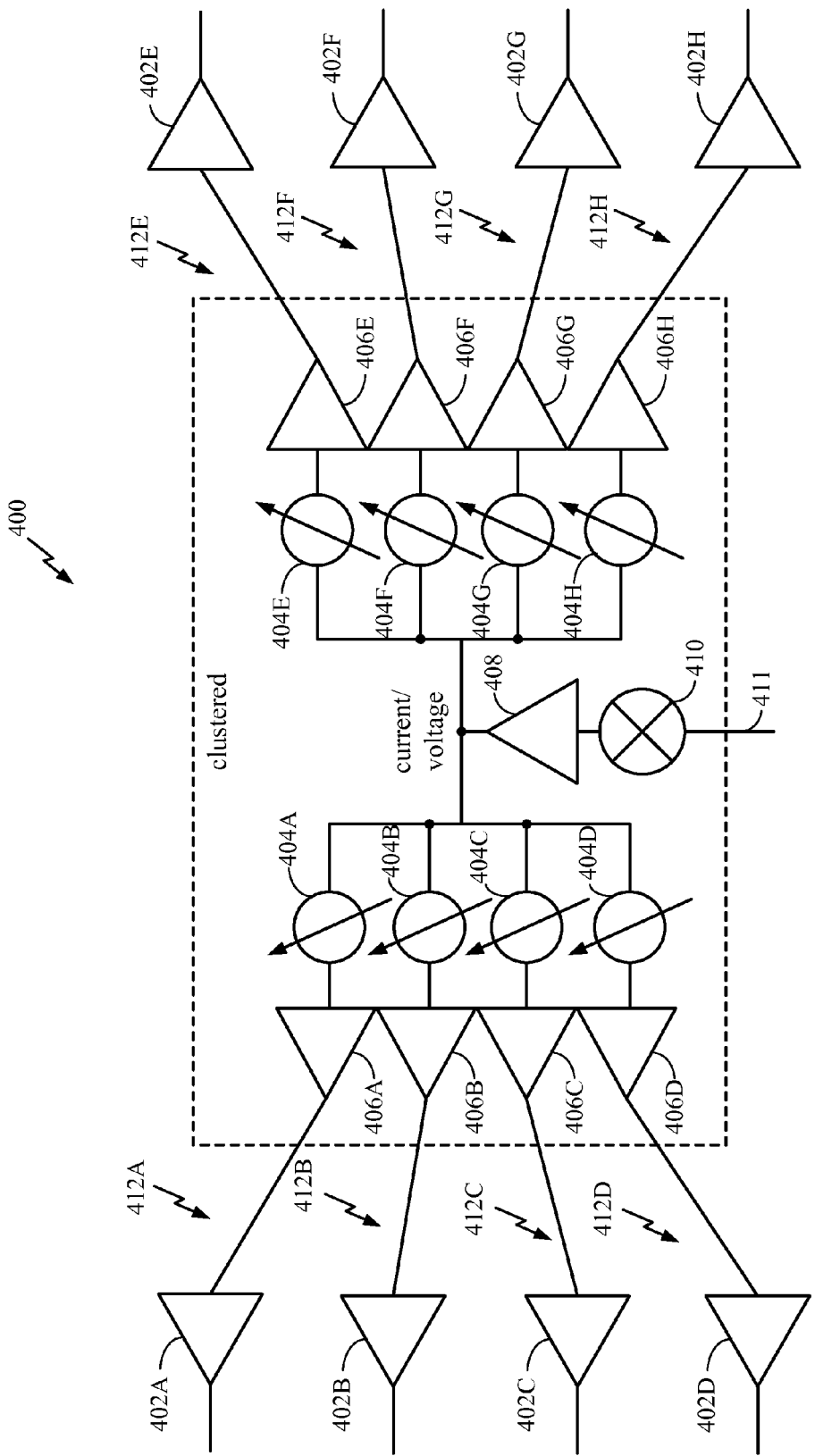
FIG. 4 illustrates another transmitter beamforming device, in accordance with an exemplary embodiment of the present invention.

FIG. 4 illustrates a device 400, according to an exemplary embodiment of the present invention. Device 400, which may also be referred to as a "transmitter beamforming architecture," includes a plurality of transmit paths 412A-412H. Each transmit path 412A-412H of device 400 includes a phase shifter 304, a driver amplifier 306, and a power amplifier 302. More specifically, for example, transmit path 412A includes driver amplifier 406A, phase shifter 404A, and power amplifier 402A. Although device 400 is illustrated as having eight transmit paths, embodiments of the present invention are not so limited. Rather, device 400 may include any number of transmit paths. Device 400 further includes mixer 410 configured to receive signal 411. Further, mixer 410 has an output coupled to amplifier 408. An output of amplifier 408 is coupled to each transmit path 412A-412H. More specifically, in the exemplary embodiment illustrated in FIG. 4, output of amplifier 408 is coupled to each input of a plurality of phase shifters 404A-404H. Each phase shifter 404A-404H has an output coupled to a respective driver amplifier 306, which is further coupled to a respective power amplifier 302. It is noted that device 400 includes eight antenna branches (i.e., each transmit path is associated with an antenna branch).

The transmit paths 412A-412H of device 400 may have similar or different routing lengths. Further, a phase shifter may be utilized to compensate for phase differences caused by different routing lengths. It is further noted that, according to one exemplary embodiment, driver amplifiers 406A-406H and phase shifters 404A-404H may be clustered proximate mixer 410. Stated another way, driver amplifiers 406A-406H and phase shifters 404A-404H may be physically proximate mixer 410 and, therefore, the distributed effect, which normally exists in millimeter wave circuits, may not be significant. As a result, a voltage and/or current domain may be used rather than a power domain.

During a contemplated operation of device 400, mixer 410 may upconvert signal 411 to radio frequency (RF) and convey the upconverted signal to amplifier 408. Further, amplifier 408 may convey an amplified signal to each transmit path 412A-412H (i.e., amplifier 408 conveys an amplified signal to an input of each phase shifter 404A-404H). Within each transmit path 412A-412H, the signal may be phase-shifted by an associated phase shifter 404, amplified by an associated driver amplifier 406, and further amplified by an associated power amplifier 402. As an example, within transmit path 412C, a signal may be phase-shifted by phase shifter 404C, amplified by driver amplifier 406C, amplified by power amplifier 402C, and conveyed to an antenna coupled to power amplifier 402C. As will be appreciated by a person having ordinary skill each power amplifier 302 may be coupled to an antenna (not shown in FIG. 3).

It is noted that, in contrast to conventional beamforming architectures, device 400 is configured for signal splitting in a voltage domain, a current domain, or both, rather than a power domain. As a result, device 400 may not require power combining or power splitting networks, which undesirably consume large amounts of area. Further, loss due to power splitting may be avoided. In addition, device 400 includes a single mixer pair and simplifies in-phase and quadrature (IQ) and DC offset calibration compared to other methods of beamforming, such as baseband beamforming or LO beamforming. As a result, a complex local oscillator (LO) distribution may not be required.

Figure 5:
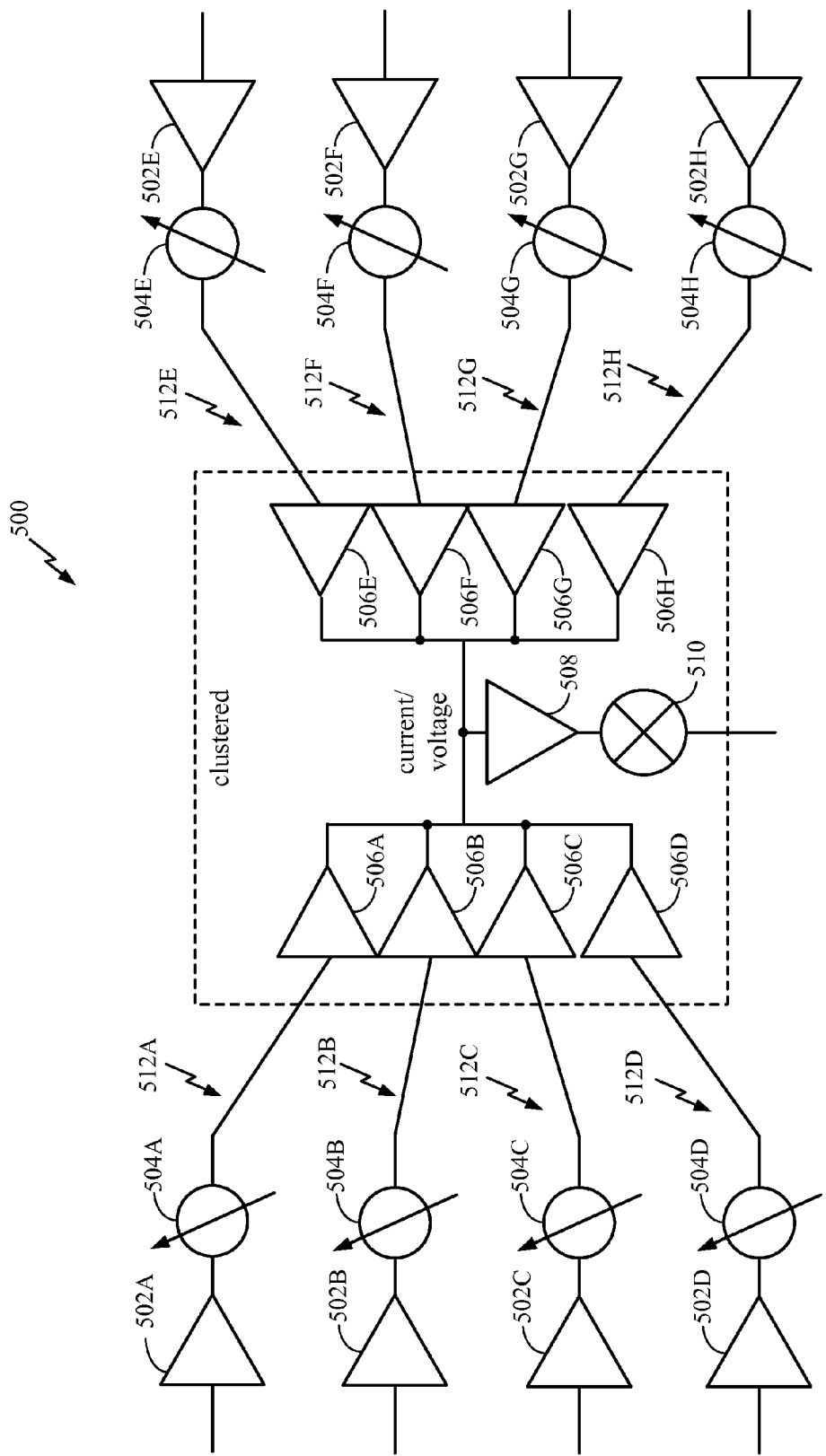
FIG. 5 illustrates a receiver beamforming device, according to an exemplary embodiment of the present invention.

FIG. 5 illustrates a device 500, according to an exemplary embodiment of the present invention. Device 500, which may also be referred to as a "receiver beamforming architecture," includes a plurality of receive paths 512A-512H. Each receive path 512A-512H includes a low-noise amplifier (LNA) 502, a phase shifter 504, and a transconductance amplifier 506. More specifically, each receive path of device 500 has a phase shifter 504 coupled between an LNA 502 and a transconductance amplifier 506. As an example, receive path 512A includes a low-noise amplifier (LNA) 502A, a phase shifter 504A, and a transconductance amplifier 506A. Although device 500 is illustrated as having eight receive paths, embodiments of the present invention are not so limited. Rather, device 500 may include any number of receive paths. Device 500 further includes an amplifier 508 having an input coupled to each receive path 512A-512H. More specifically, in the exemplary embodiment illustrated in FIG. 5, an output of each transconductance amplifier 506A-506H is coupled to an input of amplifier 508. Further, device 500 includes a mixer 510 configured to receive and downconvert a signal output from amplifier 508. It is noted that device 500 includes eight antenna branches (i.e., each transmit path is associated with an antenna). The receive paths 512A-512H of device 500 may have similar or different routing lengths. Further, a phase shifter may be utilized to compensate for phase differences caused by different routing lengths. It is further noted that, according to one exemplary embodiment, transconductance amplifiers 506A-506H may be clustered proximate mixer 510. Stated another way, transconductance amplifiers 506A-506H may be physically proximate mixer 510 and, therefore, the distributed effect, which normally exists in millimeter wave circuits, may not be significant. As a result, a voltage and/or current domain may be used rather than a power domain.

During a contemplated operation of device 500, a signal received by an antenna (not shown) may be conveyed to an associated LNA 502, which may then convey an amplified signal to an associated phase shifter 504. The phase shifter 504 may shift a phase of the received signal and convey the signal to an associated transconductance amplifier 506, which may provide an amplified signal to amplifier 508. As an example, a signal received by an antenna (not shown) may be conveyed to LNA 502D, which may then convey an amplified signal to an associated phase shifter 504D. Phase shifter 504D may shift a phase of the received signal and convey the signal to an associated transconductance amplifier 506D, which may provide an amplified signal to amplifier 508. After further amplification via amplifier 508, a combined signal may be conveyed to mixer 510, which may downconvert the combined signal to baseband for further processing.

It is noted that, in contrast to conventional beamforming architectures, device 500 is configured for signal combining in a voltage domain, a current domain, or both, rather than a power domain. As a result, device 500 may not require power combining or power splitting networks, which undesirably consume large amounts of area. Further, loss due to power combining may be avoided. In addition, device 500 includes a single mixer pair and simplifies calibration.

Figure 6:
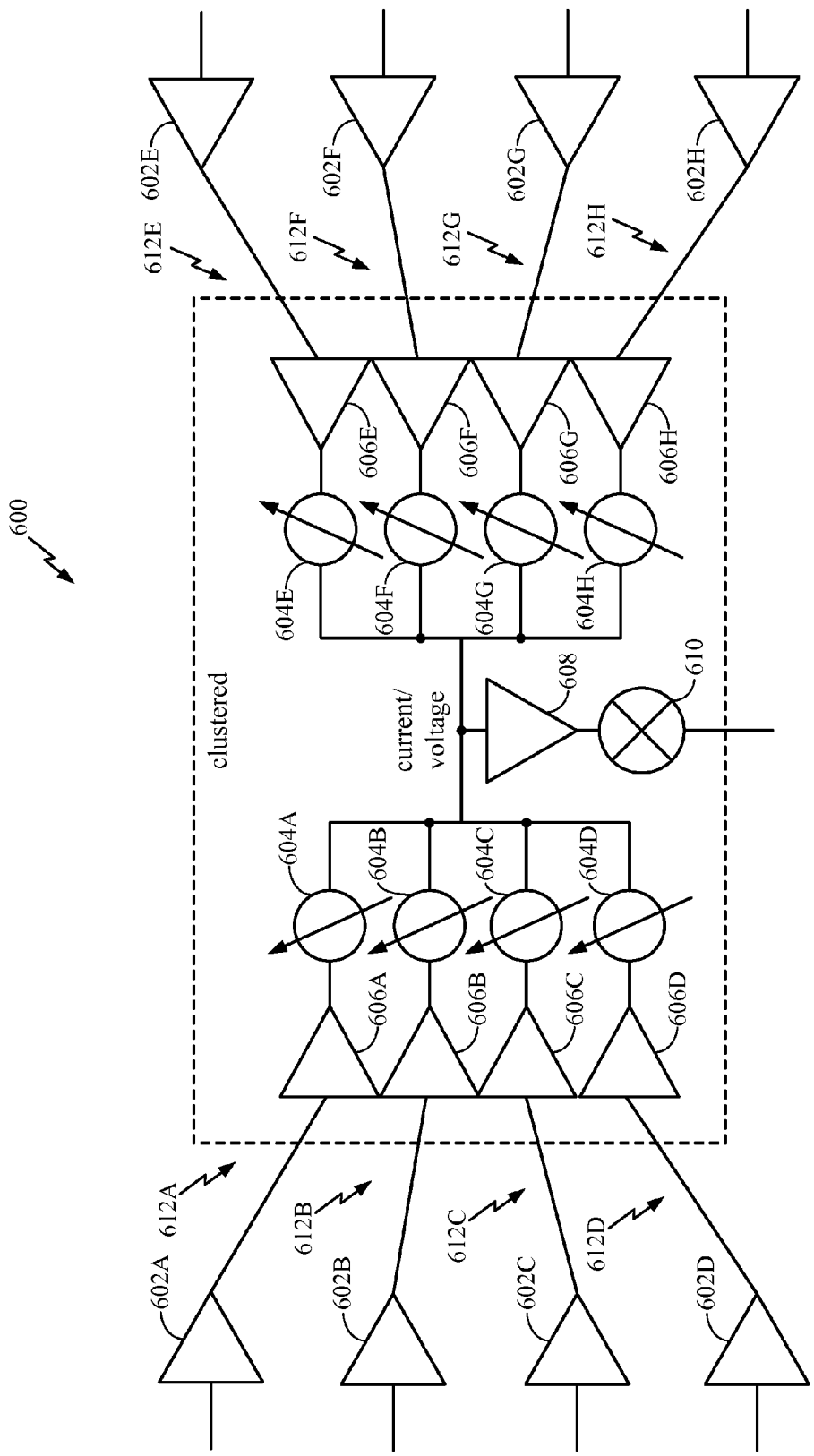
FIG. 6 illustrates another receiver beamforming device, according to an exemplary embodiment of the present invention.

FIG. 6 illustrates a device 600, according to an exemplary embodiment of the present invention. Device 600, which may also be referred to as a "receiver beamforming architecture," includes a plurality of receive paths 612A-612H. Each receive path 612A-612H includes low-noise amplifier (LNA) 602, transconductance amplifier 606, and phase shifter 604. More specifically, each receive path of device 600 has a transconductance amplifier 606 coupled between an LNA 602 and a phase shifter 604. As an example, receive path 612A includes a low-noise amplifier (LNA) 602A, a transconductance amplifier 606A, and a phase shifter 604A. Although device 600 is illustrated as having eight receive paths, embodiments of the present invention are not so limited. Rather, device 600 may include any number of receive paths. Device 600 further includes an amplifier 608 having an input coupled to each receive path 612A-612H. More specifically, in the exemplary embodiment illustrated in FIG. 6, an output of each phase shifter 604A-604H is coupled to an input of amplifier 608. Further, device 600 includes mixer 610 configured to receive and downconvert a signal output from amplifier 608. It is noted that device 600 includes eight antenna branches (i.e., each transmit path is associated with an antenna). The receive paths 612A-612H of device 600 may have similar or different routing lengths. Further, a phase shifter may be utilized to compensate for phase differences caused by different routing lengths. It is further noted that, according to one exemplary embodiment, transconductance amplifiers 606A-606H and phase shifters 604A-604H may be clustered proximate mixer 610. Stated another way, transconductance amplifiers 606A-606H and phase shifters 604A-604H may be physically proximate mixer 610 and, therefore, the distributed effect, which normally exists in millimeter wave circuits, may not be significant. As a result, a voltage and/or current domain may be used rather than a power domain.

During a contemplated operation of device 600, a signal received by an antenna (not shown) may be conveyed to an associated LNA 602, which may then convey an amplified signal to an associated transconductance amplifier 606. The transconductance amplifier 606 may provide amplification and convey the signal to an associated phase shifter 604, which may provide a desired phase shift and, thereafter, convey the signal to amplifier 608. As an example, a signal received by an antenna (not shown) may be conveyed to an associated LNA 602F, which may then convey an amplified signal to an associated transconductance amplifier 606F. Transconductance amplifier 606F may provide amplification and convey the signal to an associated phase shifter 604F, which may provide a desired phase shift and, thereafter, convey the signal to amplifier 608. After further amplification via amplifier 608, a combined signal may be conveyed to mixer 610, which may downconvert the combined signal to baseband for further processing.

It is noted that, in contrast to conventional beamforming architectures, device 600 is configured for signal combining in a voltage domain, a current domain, or both, rather than a power domain. As a result, device 600 may not require power combining or power splitting networks, which undesirably consume large amounts of area. Further, loss due to power combining may be avoided. In addition, device 600 includes a single mixer pair and simplifies calibration compared to other beamforming methods, such as baseband beamforming or LO beamforming.

Figure 7:
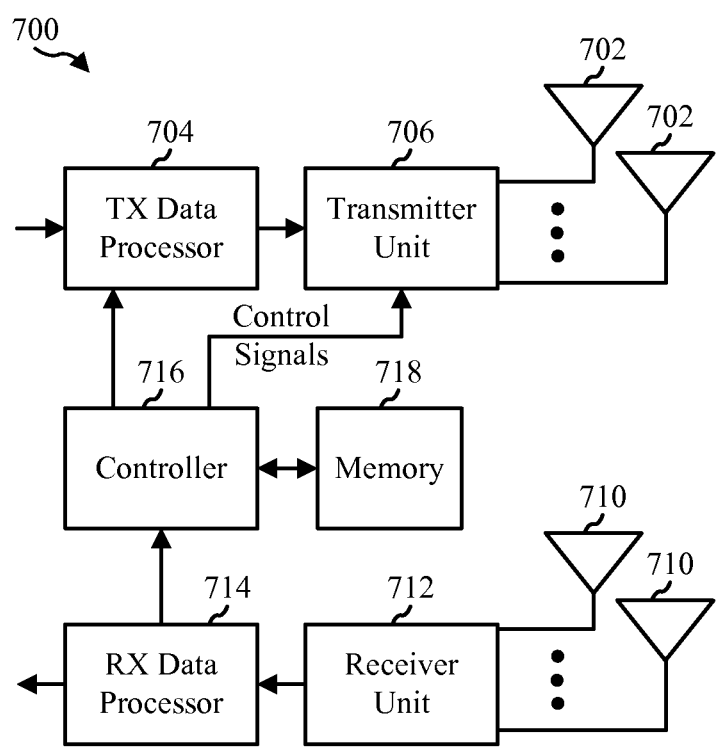
FIG. 7 illustrates a device including a transmitter unit and a receiver unit, in accordance with an exemplary embodiment of the present invention.

FIG. 7 shows a block diagram of an embodiment of a device 700. Device 700 may include one or more antennas 702. During signal transmission, a transmit (TX) data processor 704 receives and processes data and generates one or more streams of data. The processing by TX data processor 704 is system dependent and may include, e.g., encoding, interleaving, symbol mapping, and so on. For a CDMA system, the processing typically further includes channelization and spectral spreading. TX data processor 704 also converts each stream of data into a corresponding analog baseband signal. A transmitter unit 706 receives and conditions (e.g., amplifies, filters, and frequency upconverts) the baseband signals from TX data processor 704 and generates an RF output signal for each antenna used for data transmission. The RF output signals are transmitted via antennas 702. During signal reception, one or more signals may be received by antennas 710, conditioned and digitized by a receiver unit 712, and processed by an RX data processor 714. Controller 716 may direct the operation of various processing units within device 125. Further, memory units 718 may store data and program codes for controllers 716. It is noted that transmitter unit 706 may include device 300, which is illustrated in FIG. 3, or device 400, which is illustrated in FIG. 4. Further, receiver unit 712 may include device 500, which is illustrated in FIG. 5, or device 600, which is illustrated in FIG. 6.

Figure 8:
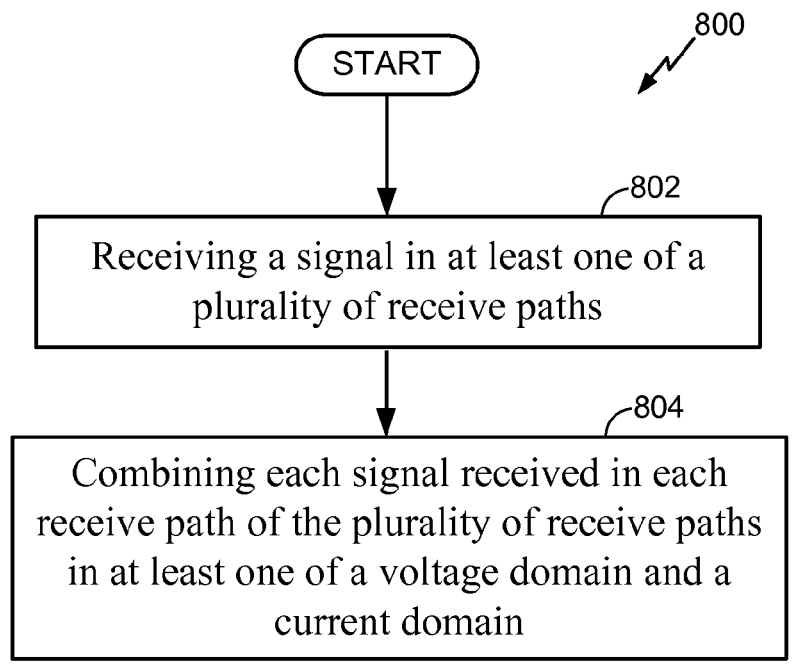
FIG. 8 is a flowchart illustrating a method, according to an exemplary embodiment of the present invention.

FIG. 8 is a flowchart illustrating a method 800, in accordance with one or more exemplary embodiments. Method 800 may include receiving a signal in at least one of a plurality of receive paths (depicted by numeral 802). Method 800 may also include combining each signal received in each receive path of the plurality of receive paths in at least one of a voltage domain and a current domain (depicted by numeral 804).

Figure 9:
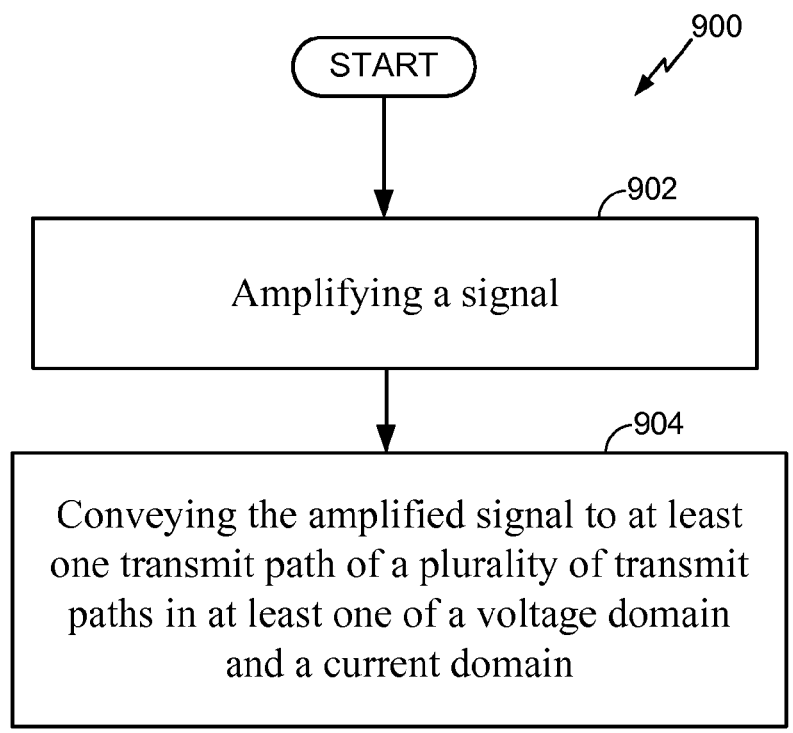
FIG. 9 is a flowchart illustrating another method, according to an exemplary embodiment of the present invention.

FIG. 9 is a flowchart illustrating another method 900, in accordance with one or more exemplary embodiments. Method 900 may include amplifying a signal (depicted by numeral 902). Further, method 900 may include conveying the amplified signal to at least one transmit path of a plurality of transmit paths in at least one of a voltage domain and a current domain (depicted by numeral 904).

As disclosed above, exemplary embodiments include beamforming devices configured to process signals (i.e., signal splitting or signal combining) in a voltage domain, a current domain, or both, rather than in a power domain. Accordingly, in comparison to conventional devices, the beamforming devices described herein may not require area consuming power splitting networks and power combining networks. As a result, loss caused by either power combining networks or power splitting networks may also be avoided. Further, impedance matching (e.g., matching to a 50 Ohm or 100 Ohm impedance) may not be required.

Exemplary embodiments, as described herein, may be suitable for various modulation techniques including, but not limited to, QPSK, 16-QAM, and 64-QAM. Further, embodiments of the present invention may be suitable for double side balanced mixers or single side balance mixers. Further, exemplary embodiments of the present invention, which are suitable for transmitter and receivers implementations, are capable of providing 360 degree coverage. As described above, digitally controlled switches may be used for phase combining and rotating, and quadrant selection may be based on a desired total phase shift.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device, comprising:
a plurality of receive paths each comprising a first amplifier;
an additional amplifier coupled to each output of the plurality of the receive paths; and
a mixer coupled to an output of the additional amplifier, the device configured to combine each signal from each of the plurality of receive paths in at least one of a voltage domain and current domain and exclusive of a power combiner,
wherein the first amplifier are clustered proximate the mixer.

2. The device of claim 1, wherein the first amplifier comprises a transconductance amplifier, each of the plurality of receive paths including a phase shifter coupled between a low noise amplifier (LNA) and the transconductance amplifier.

3. The device of claim 1, wherein the first amplifier comprises a transconductance amplifier, each receive path including the transconductance amplifier coupled between a phase shifter and a low noise amplifier (LNA).

4. A method, comprising:
receiving a signal in each of a plurality of receive paths;
combining at an input of an amplifier into a combined signal each signal received in each of the plurality of receive paths in at least one of a voltage domain and a current domain and exclusive of a power combiner; and
downconverting a version of the combined signal output from the amplifier,
wherein the receiving comprises amplifying a version of the signal at an area physically proximate to an area where the downconverting is performed.

5. The method of claim 4, the receiving a signal comprising receiving a signal in each of a plurality of receive paths comprising a phase shifter coupled between a low noise amplifier (LNA) and a transconductance amplifier.

6. The method of claim 4, the receiving a signal comprising receiving a signal in at least one of a plurality of receive paths comprising a transconductance amplifier coupled between a low noise amplifier (LNA) and a phase shifter.

7. The method of claim 4, further comprising amplifying the combined signal.

8. A device, comprising:
means for receiving a signal in each of a plurality of receive paths comprising means for amplifying;
means for combining at an input of an amplifier into a combined signal each signal received in each of the plurality of receive paths in at least one of a voltage domain and a current domain and exclusive of a power combiner; and
means for downconverting an output of the amplifier,
wherein the means for amplifying are clustered proximate the means for downconverting.

* * * * *